Patented Dec. 2, 1952

2,620,315

UNITED STATES PATENT OFFICE 2,620,315

POLYETHYLENEMELAMINE-POLYAMINE REACTION PRODUCTS

Lennart A. Lundberg, Stamford, Conn., assignor to American Cyanamid Company, New York, N. Y., a corporation of Maine No Drawing. Application November 25, 1950, Serial No. 197,632

7 Claims. (Cl. 260—2)

This invention relates to anion active resins, to processes for preparing them, and to processes for anion removal or exchange in which they are used.

In the past, anion exchange resins have been prepared by cross-linking aliphatic polyamines, and particularly polyalkylene polyamines, with formaldehyde, polyhalides, halohydrins, and the like.

Furthermore, anion exchange resins containing melamine have been prepared. In these cases, however, the melamine has been present in the resin as a condensation product with formaldehyde. Examples of this type resin may be prepared, for example, as described in the Swain Patent No. 2,285,750. While such resins have been good anion exchangers, some of them have had poor life as a result of the relatively unstable >N—CH₂—N< linkage present.

It is an object of the present invention to provide anion exchange resins which contain a melamine nucleus and which have good life for anion exchange.

A further object of the present invention is the preparation of new and improved anion exchange resins.

Another object of the present invention is a process for preparing new anion exchange resins.

Still another object of the present invention is the provision of a process for the preparation of anion exchange resins containing a melamine nucleus.

It is a further object of the present invention to provide a process for removing anions from, or exchanging anions in, water and other liquid media by means of new anion exchange resins.

The above and other objects are attained by bringing about reaction between a polyethylene derivative of otherwise unsubstituted melamine such as diethylenemelamine or triethylenemelamine and an aliphatic polyamine. The polyethylene derivatives may be represented by the following formulae:

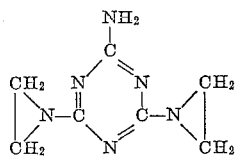

and

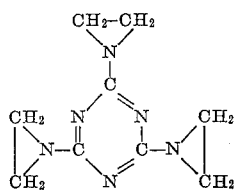

Triethylene melamine is a known compound and can be prepared, for example, by the method described in the Wystrach and Kaiser U. S. Patent No. 2,520,619. The preparation of diethylene melamine is described in the copending application of Donald W. Kaiser and Frederic Schaefer, Serial No. 165,861 filed June 2, 1950.

The invention will be described in greater detail in conjunction with the following specific examples in which proportions are given in parts by weight. It should be understood that the examples are merely illustrative and it is not intended that the scope of the invention be limited to the details therein set forth.

Example 1

30.6 parts (0.15 mol) of triethylenemelamine
20 parts (0.195 mol) of diethylenetriamine
100 parts of water A mixture of the three ingredients is heated at about 100° C. Gelation occurs within five minutes to give a clear, water-white, rigid gel. The gel is cured for 17 hours in a free draft oven at 100° C. The cured granulated resin, upon evaluation, was found to have a capacity for anion exchange of 17.4 kilograins as calcium carbonate per cubic foot of resin and a density of 19.1 pounds per cubic foot.

Example 2

30.6 parts (0.15 mol) of triethylenemelamine
22.8 parts (0.175 mol) of dipropylenetriamine
100 parts of water The procedure of Example 1 is followed. A resin having a capacity for anion exchange of 13.7 kilograins as calcium carbonate per cubic foot of resin and a density of 11 pounds per cubic foot is obtained.

Example 3

30.6 parts (0.15 mol) of triethylenemelamine
33.2 parts (0.175 mol) of tetraethylenepentamine
100 parts of water The procedure of Example 1 is followed. A resin having a capacity for anion exchange of 20.4 kilograins as calcium carbonate per cubic foot of resin and a density of 16.5 pounds per cubic foot is obtained.

Example 4

30.6 parts (0.15 mol) of triethylenemelamine
15.3 parts (0.175 mol) of 1,3-diaminopropanol-2
100 parts of water The procedure of Example 1 is followed. A resin is obtained which has a capacity for anion exchange of 13.8 kilograins as calcium carbonate per cubic foot of resin and a density of 11.5 pounds per cubic foot.

Similar results are obtained when diethylenemelamine is used in place of triethylenemelamine in the examples.

Resins may also be prepared from other polyfunctional ethyleneimine derivatives such as

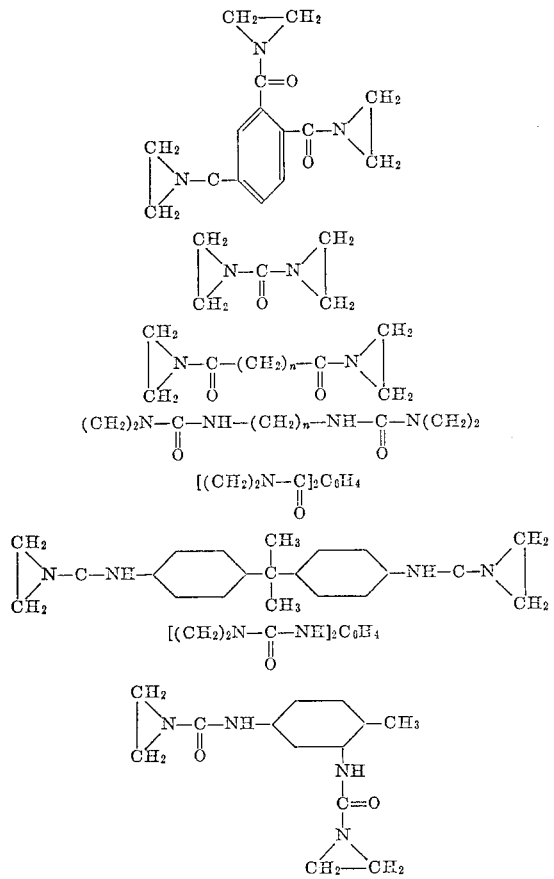

by reaction with amines. Many of these resins, however, are not good ion exchangers and are unsuitable for such an application just as are resins prepared by reacting the ethylene melamine derivatives with ammonia instead of with polyamines.

Similarly, the present invention is not limited to the use of the polyamines of the specific examples. Other polyamines containing primary amino groups which may be used include ethylenediamine, 1,3-diaminopropane, 1,3-diaminopropanone, 1,4-diamino-n-butane, 1,3-diamino-n-butane, 1,5-diamino-n-pentane, 1,6-diamino-n-hexane, 1,10-diamino-n-decane, 1,6-diamino-3-methyl-n-hexane and hydroxyl derivatives thereof such as 1,3-diaminopropanol-2, and the like. I may also use, in the process of the present invention, diamines containing hetero atoms in the chains separating the amino groups. Examples of such diamines include 3,3'-diaminopropyl ether, bis(3,3'-diaminodiethyl)sulfide, bis(3,3'-diaminodiethyl) sulfone, and the like.

I prefer to use polyalkylene polyamines in the process of my invention, examples of such polyamines including diethylenetriamine, triethylenetetramine, tetraethylenepentamine, pentaethylenehexamine, dipropylenetriamine, and higher homologs thereof containing additional —RNH— (where R is alkylene) groups in the chain between the primary amino groups. Complex mixtures of polyethylenepolyamines of high molecular weight obtained by the addition of a large excess of ammonia to ethylene dibromide, ethylene dichloride epichlorhydrin or the like may be used also.

The present invention is not limited to the use of a single aliphatic polyamine any more than it is limited to the use of a single polyethylenemelamine, and a mixture of two or more polyamines may be used just as a mixture of the di- and triethylenemelamine may be used.

For every mol of aliphatic polyamine used in the preparation of my new products there should be supplied at least one mol of di- or tri-ethylenemelamine and preferably from about 1.1 to 1.7 mols. Use of higher proportions possesses no advantages, and the density of the resin produced is high.

The condensation of the di- or tri-ethylenemelamine with the aliphatic polyamine may be carried out in the presence of any desired solvent which is inert to the reactants and to the reaction products. Suitable solvents include water, methanol, ethanol, the monomethyl or monoethyl ether of ethylene glycol and the like. Obviously, for practical reasons, water is the preferred medium.

The reaction temperature is not critical and while I prefer effecting the condensation at about 100° C., the reaction temperature may be varied from about 20° C. to about 100° C., as desired. The final heat treatment for curing the resin is preferably effected at about 95°–105° C. in dry heat, although other conditions including temperatures from about 50° up to about 125° C. or higher may be used.

The anion active resins of the present invention may be activated or regenerated by treatment with dilute alkaline solutions such as, for example, 0.1%–10% aqueous solutions of sodium hydroxide, sodium carbonate, ammonium hydroxide, etc.

The resinous materials produced in accordance with this invention are suitable for the removal of anions in general from liquid media. They may be used to extract strong mineral acids (preferably present in relatively low concentrations) as well as weaker inorganic acids such as silica, boric acid, hydrocyanic acid and the like and organic acids such as acetic acid, oxalic acid, et. from aqueous and other solutions. The anions of salts such as the chloride ion in ammonium chloride or the sulfate ion in ammonium sulfate may be removed by means of our new anion exchange products.

Thus, the anion active resins are useful for many purposes, examples of which are removal of acids from water and from alcoholic solutions, the purification of sugar solutions including cane and beet sugar solutions, molasses, grapefruit, pineapple and other fruit waste, purification of pectin, gelatin, formaldehyde solutions, etc While my new resins are especially suitable for the removal of anions from aqueous media, they may be also used to extract acids or anions from other liquid media, and they may even be used for the extraction of acids from gases.

To be sufficiently insoluble for practical use in the water purification art, resins should have a sufficiently low solubility that they will not be dissolved by the solution being treated. Thus 1000 parts of water should not dissolve more than 1 part of the resin when water is passed through a bed of resin after the first cycle comprising an activation, exhaustion and reactivation of the resin.

While my invention is not in any sense limited thereto I prefer to use products of a particle size of from about 8 to about 60 mesh, screened dry on a U. S. standard screen. These may be ground to size, or they may be prepared in beaded form.

I claim:

1. A water-insoluble, granular, anion active-resinous material suitable for the removal of anions from aqueous solutions which is a reaction product of an aliphatic polyamine and a polyethylene melamine which is a polyamino-s-triazine wherein at least two of the amino nitrogen atoms each has one ethylene group attached thereto instead of the two hydrogen atoms.

2. A water-insoluble, granular, anion active resinous material suitable for the removal of anions from aqueous solutions which is a reaction product of an aliphatic polyamine and triethylene melamine, the formula for which is

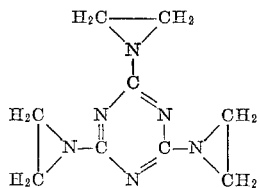

3. A material according to claim 2 wherein the aliphatic polyamine is a polyalkylene polyamine.

4. A material according to claim 2 wherein the aliphatic polyamine is a polyethylene polyamine.

5. A material according to claim 2 wherein the aliphatic polyamine is dipropylenetriamine.

6. A process of preparing a water-insoluble, granular, anion active resinous material suitable for the removal of anions from aqueous solutions which comprises reacting an aliphatic polyamine with polyethylene melamine which is a polyamino-s-triazine wherein at least two of the amino nitrogen atoms each has one ethylene group attached thereto instead of the two hydrogen atoms.

7. A process of preparing a water-insoluble, granular, anion active resinous material suitable for the removal of anions from equeous solutions which comprises reacting an aliphatic polyamine with triethylene melamine, the formula for which is

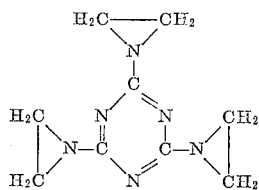

LENNART A. LUNDBERG.

REFERENCES CITED

The following references are of record in the file of this patent:

UNITED STATES PATENTS

| Number | Name | Date |
|---|---|---|
| 2,524,727 | Dudley | Oct. 3, 1950 |
| 2,582,614 | Wohnseidler et al. | Jan. 15, 1952 |

OTHER REFERENCES

Smith, Synthetic Fiber Developments in Germany (Textile Research Institute), 1946, pp. 27–29.